United States Patent [19]
Morris

[11] 3,860,075
[45] Jan. 14, 1975

[54] ROW CROP ROTARY ROD WEEDER

[75] Inventor: George H. Morris, Yorkton, Canada

[73] Assignee: Morris Rod-Weeder Co. Ltd., Yorkton, Saskatchewan, Canada

[22] Filed: Feb. 20, 1973

[21] Appl. No.: 334,163

[30] Foreign Application Priority Data
Jan. 11, 1973  Canada ................................ 161081

[52] U.S. Cl. .................................. 172/44, 172/265
[51] Int. Cl. ............................................ A01b 39/19
[58] Field of Search ............. 172/44, 106, 265, 699, 172/720, 60

[56] References Cited
UNITED STATES PATENTS
| | | | |
|---|---|---|---|
| 698,586 | 4/1902 | Thompson | 172/720 X |
| 2,954,085 | 9/1960 | Roberts | 172/44 |
| 3,135,338 | 6/1964 | Morris | 172/44 |
| 3,140,678 | 7/1964 | Morris | 172/44 X |
| 3,202,221 | 8/1965 | Monk et al. | 172/60 X |
| 3,312,288 | 4/1967 | Cervenka | 172/44 |
| 3,661,101 | 5/1972 | Parsons | 172/44 X |
| 3,749,177 | 7/1973 | Keyser et al. | 172/720 X |

Primary Examiner—Edgar S. Burr
Assistant Examiner—Paul T. Sewell

[57] ABSTRACT

A rotary rod weeder is provided for weeding between the rows of a standing crop such as corn. The weeder is mounted behind a tractor and has a plurality of rod support legs, each leg carrying a rod spaced from the adjacent rod to permit passage of the crop therebetween. Each rod is individually driven and each drive leg is deflectable should it strike an obstruction. Weeds are pulled from the ground and left on the surface.

10 Claims, 11 Drawing Figures

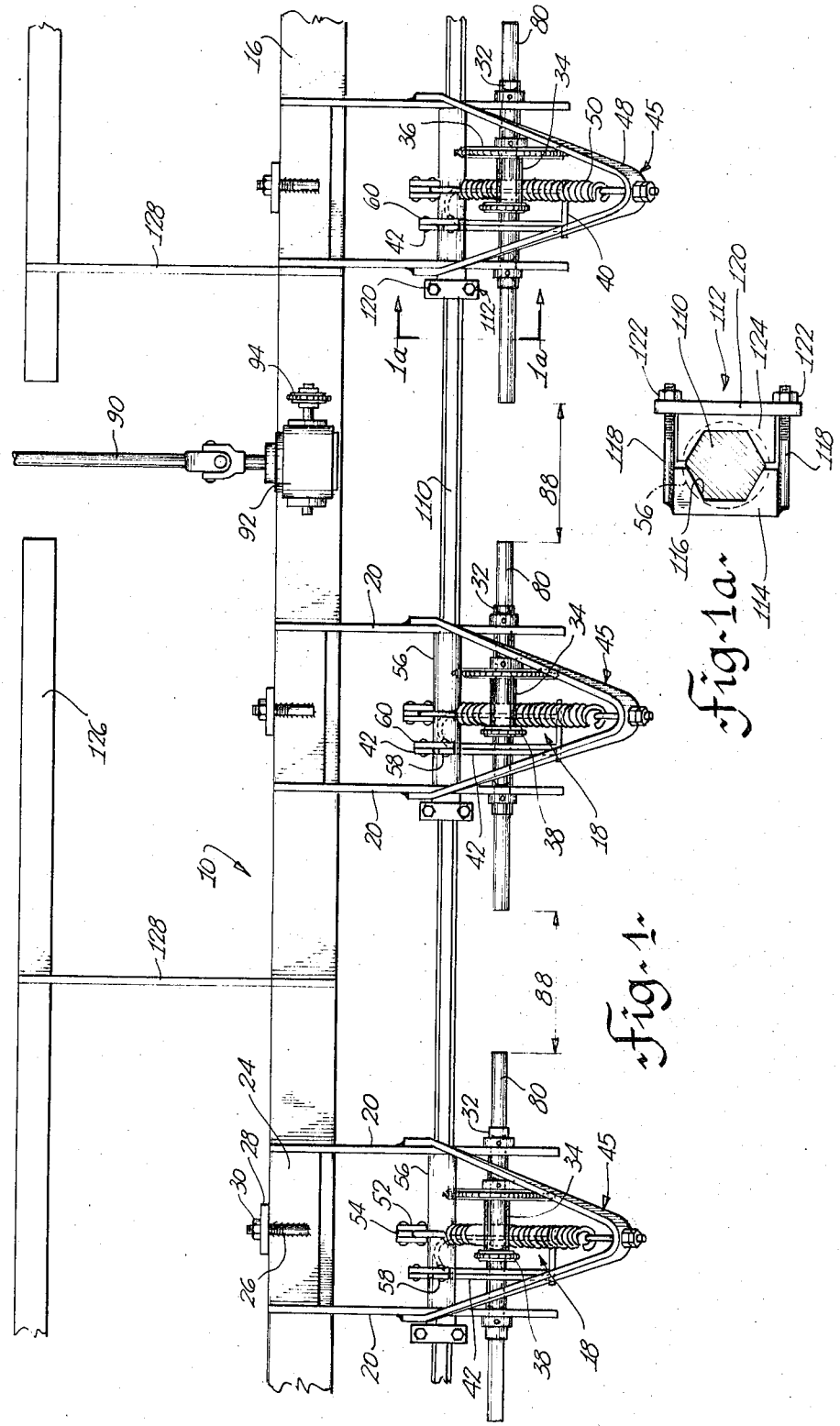

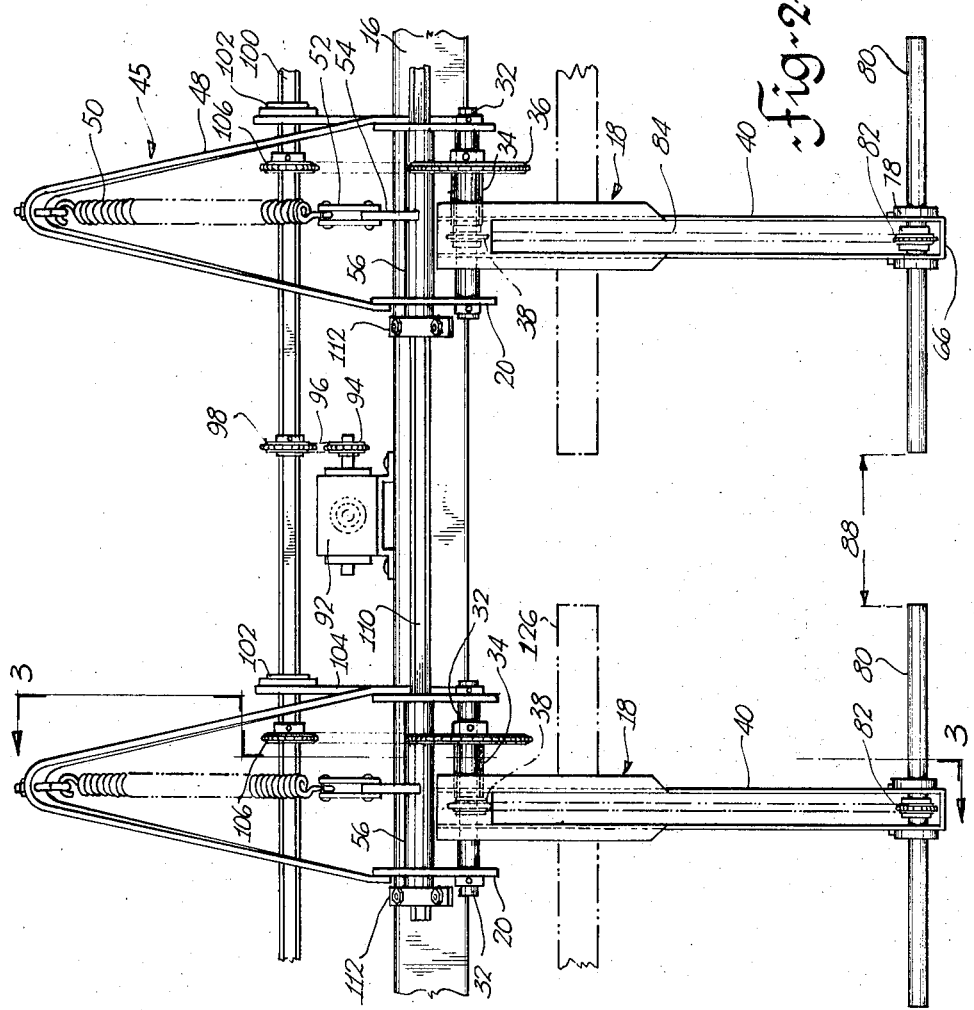
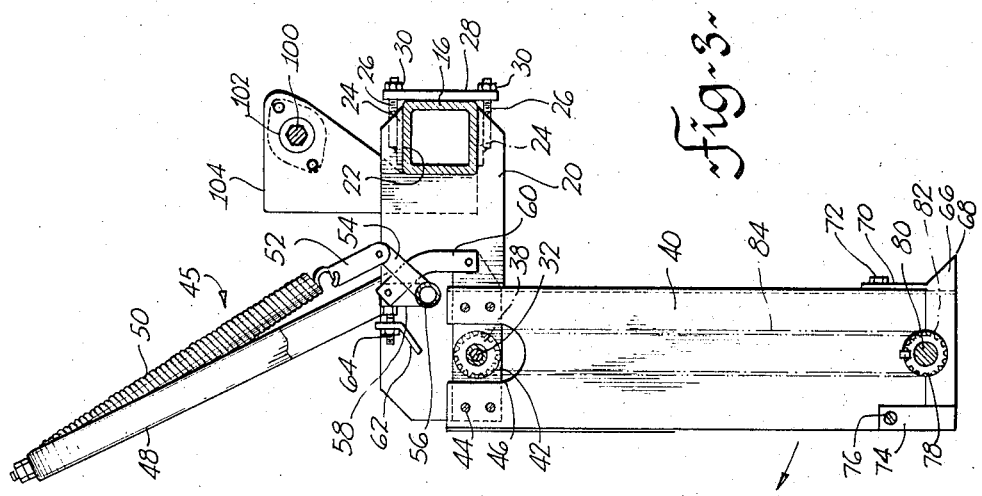

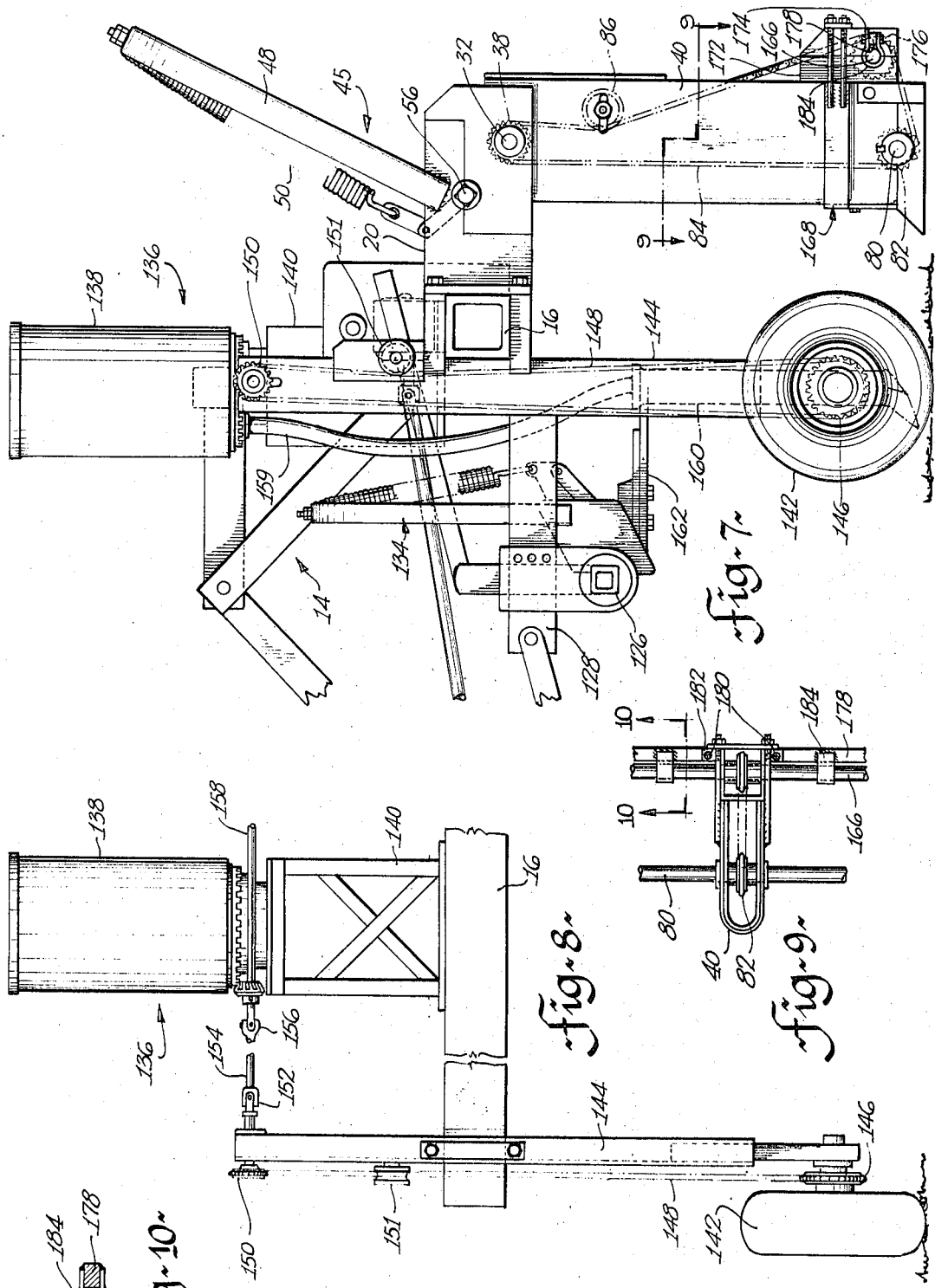

ROW CROP ROTARY ROD WEEDER

The present invention relates generally to weeders and particularly to a row weeder of the rotary rod type.

It has been known in the past to weed rows of standing crops with cultivator type earth working equipment. Such weeders tend to cut the weeds off at their working depth and often miss weeds that slide around and are deeper rooted than normal, thus making another pass necessary. In addition, such equipment is difficult to maintain in alignment behind a tractor and the danger always exists that the weeder will veer towards the row crop and cut the roots thereof. Since crops such as corn are cultivated 2 or 3 times during the early growth period (to a height of about two feet) it is imperative that the equipment not harm the crop and be as efficient as possible.

The above problems are overcome by the present invention which provides a plurality of individual driven rotary rod weeders for weeding between rows of standing crops. The rods continuously weed the ground, even very close to the crops, by pulling the weeds rather than cutting them, thereby permitting operation at a shallower depth. In addition the rods pack the ground below the surface and leave a mulch on top, both of which conserve moisture. Each rod is mounted on its own support leg and is individually driven. Each leg is provided with an automatic tripping device which permits deflection of the leg should it hit an obstruction, and restoration thereof to its working attitude. It is also possible to replace the individual rods with a single continuous rod for harvesting crops such as pinto beans etc. or for use as a swather or windrower. In this configuration the drive legs are ganged together for deflection purposes.

Other modifications to the invention and advantages thereof will become apparent in view of the following description which refers to the drawings wherein:

FIG. 1 is a partial plan view of the row crop rod weeder of the present invention in its basic form.

FIG. 1a is a view of a clamping device used when ganging the drive legs together and is viewed along the line 1a—1a of FIG. 1.

FIG. 2 is a partial rear view showing the drive legs in position.

FIG. 3 is a side view of a drive leg illustrating the automatic tripping device, taken along line 3—3 of FIG. 2.

FIG. 7 is a partial side view showing the seeding attachment and a further modification to the rod weeder portion.

FIG. 8 is a partial simplified end view showing the drive for the seeding attachment.

FIG. 9 is a view taken on line IX—IX of FIG. 7, and

FIG. 10 is a view taken along lines X—X of FIG. 9.

Figure 4:
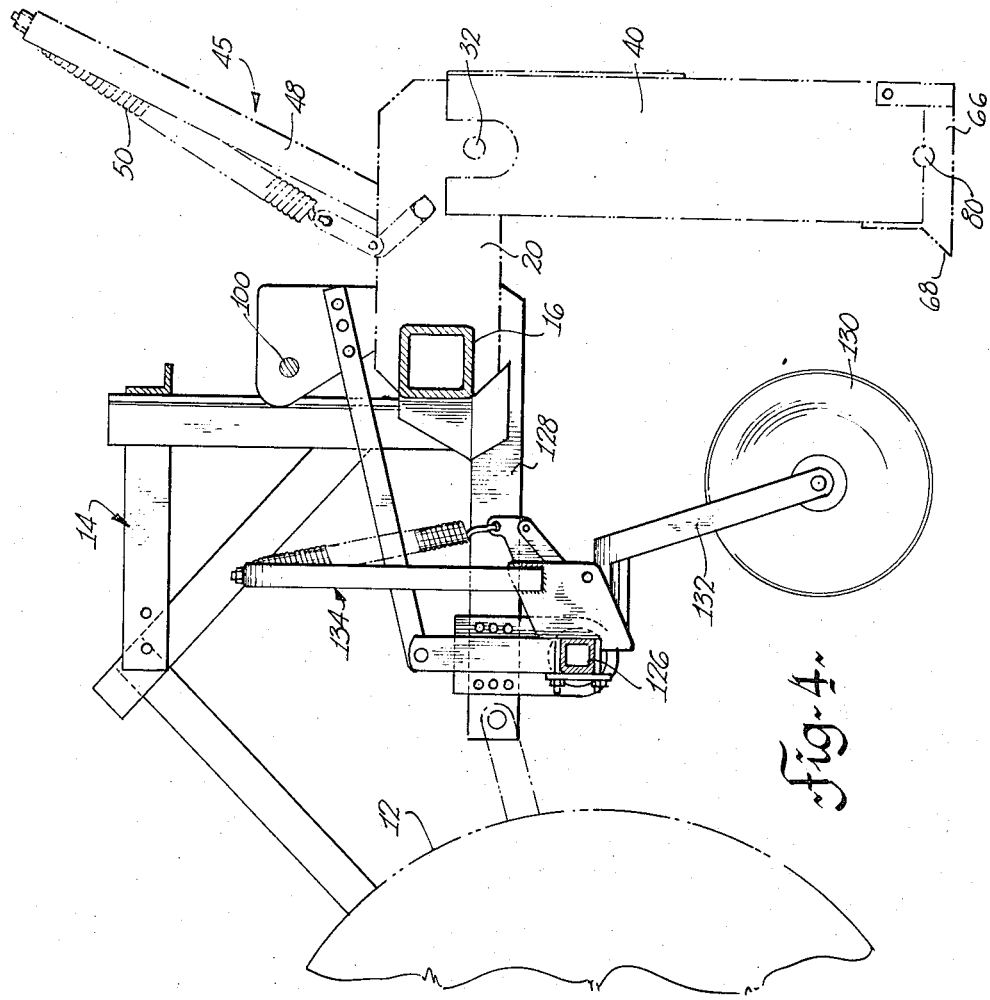
FIGS. 4, 5 and 6 are simplified side views showing various attachments.

The row crop rotary rod weeder 10 of the present invention is especially adapted to be mounted behind a farm tractor 12 utilizing a three point hitch 14 such as is covered by my Canadian Patent No. 730,427, issued Mar. 22, 1966.

As illustrated in FIGS. 1 and 2 the rod weeder of the present invention includes a main bar 16 which extends the full width of the weeder and essentially constitutes the backbone thereof since the various components to be hereinafter described are attached thereto. Main bar 16 is preferably a steel tube of square cross-section typically 4' × 4'. In the embodiment illustrated in FIG. 1 three independent rod support means 18 are movably attached to the main bar 16, thereby permitting weeding of the ground between four rows of a standing crop. It is understood that the number of support means provided can vary in spacing and quantity from the number illustrated, depending on the use to which the weeder will be put.

A typical support assembly means 18 will now be described with particular reference to FIGS. 2 and 3. A mounting portion of the support is movably attachable to the main bar 16 and comprises a pair of side plates 20 spaced apart along the main bar, each plate having a cut-out 22 which will fit snugly over the main bar. In contact with the bar, one on top and one on the bottom thereof, are flat plates 24 which extend between side plates 20 and are welded thereto. Projecting outwardly from and welded to the outermost surface of each flat plate, centrally thereof, is a threaded stud 26. Each stud extends outwardly beyond the adjacent face of main bar 16 and is adapted to receive the clamping plate 28 thereover such that a nut 30 may be threaded thereon to hold the clamping plate against the said adjacent face. Thus the clamping action effected by cut-outs 22 and by clamping plate 28 tightly holds support means 18 against main bar 16. Loosening nuts 30 permits the entire support to be slid along bar 16 to a new position, typical spacing of the supports 18 being from 20 to 48 inches.

A shaft 32 extends between side plates 20 near the rearward end thereof as shown in FIGS. 1 and 3, each end of the shaft being supported in the appropriate side plate in a well known manner. A sleeve 34 is slidably and rotatably mounted on shaft 32 and has fixed thereto at respective ends thereof a large diameter driven sprocket 36 and a small diameter driver sprocket 38. Sprocket 38 is centrally located in U-shaped drive leg 40 which is bolted to pivot plate 42 by bolts 44 as shown in FIG. 3. Pivot plate 42 is, in turn, welded to shaft 32. Also as shown in FIG. 3, drive leg 40 is provided with a U-shaped cut out 46 to permit passage therethrough of shaft 32 and sleeve 34. Since shaft 32 is free to rotate, it thus becomes a pivot axis for drive leg 40, the purpose of the shaft becoming more apparent in the following description.

Also welded to side plates 20 is tripping device 45 which includes an upwardly and rearwardly extending inverted V-shaped bracket 48 which incorporates an adjustable connection at the apex thereof for one end of a heavy tension spring 50 (FIGS. 2 and 3). The other end of spring 50 is connected to a first link 52 which in turn is pivotably connected to one end of a first arm 54. The other end of the arm 54 is fixed to hollow rocker shaft 56 which extends between and is journalled in side plates 20, parallel to shaft 32. One end of a second arm 58 is also fixed to rocker shaft 56 as by welding but it is angularly displaced from arm 54. A second link 60 is pivotably connected at one end to the other end of second arm 58 and at its other end to pivot plate 42. A mounting plate 62 is welded to one side plate and is provided with an adjustable stop 64 to limit the rearward rotation of rocker shaft 56 through interference with arm 58.

The operation of tripping device 45 is as follows, the directions mentioned being with reference to FIG. 3. Should drive leg 40 be forced in a direction as indicated by the arrow (clockwise), pivot plate 42 and leg 40 will rotate with shaft 32 to exert a tension force on second link 60 which in turn will act on arm 58 to rotate rocker shaft 56 clockwise. First arm 54 will act on first link 52 to extend spring 50. Once the cause for the clockwise motion of drive leg 40 has been overcome, the spring 50 will retract, thereby imparting a counterclockwise restoring motion to the various links and arms, rocker shaft 56, pivot plate 42 and drive leg 40. The arc of restoration is limited by the abutment of arm 58 against adjustable stop 64.

Secured to the lower end of drive leg 40 is a shoe 66 which incorporates a point 68 and an upstanding strap 70 which, in turn, is bolted at the front thereof to the front face of the drive leg 40. Straps 74 are welded in an upright position at the rear of shoe 66 to effect further attachment of the shoe to the drive leg via bolts 76. Bearings 78 are mounted in a circular opening formed half in the leg and half in the shoe and are adapted to receive the rod 80 of the rod weeder. Attached to the rod 80 is a driven sprocket 82 located centrally within the drive leg and connected to sprocket 38 by chain 84. An idler sprocket 86 (FIG. 7) located part way down the drive leg engages chain 84 in order to maintain proper tension therein.

Each rod 80 is individually supported in its own drive leg 40 such that a space 88 exists between adjacent rods. The space 88 need only be 6 to 8 inches, a distinct advantage over wider spaced shovels as used in the prior art. Also, since the rod pulls the weeds, it need not operate as deeply and hence the ground below the surface is packed and a mulch is formed on the surface, a moisture conserving feature. It is intended that when in use, the rows of standing crops will be passed through the spaces 88 while the rods weed the ground between the rows. While it is normal for the rods to be mounted in the drive legs such that they extend an equal amount on either side thereof, it is contemplated that the two outboard rods have their outwardly projecting sections shorter than their inwardly projecting sections to avoid damage to the roots of the adjacent outboard crops should the tractor stray slightly from its true path.

Referring to FIGS. 1 and 2, drive for the rods of the rotary rod weeder is provided by the power take-off unit of the tractor. Drive shaft 90 is connected to gear box 92 which in turn drives a sprocket 94 on its output shaft. Chain 96 drivingly interconnects sprocket 94 with sprocket 98 on drive shaft 100 which extends across the width of the rod weeder and is mounted in bearings 102 in extension plates 104 fixed to one of the side plates 20 of each support leg assembly 18. Aligned with each sprocket 36 is a sprocket 106 mounted on the drive shaft, there being a chain 108 interconnecting them and an idler sprocket (not shown) for ensuring proper tension in the chain. The idler sprocket is rotatably mounted on the extension plate 104. Thus it is readily apparent that each rod 80 is individually driven from the common drive shaft 100, a typical speed being 165 RPM. Even if one of the drive legs 40 is deflected from its normal vertical attitude, the remaining legs will continue to be driven in their vertical attitudes by the present drive means. In fact, the deflected rod itself will continue to be driven since there is no disconnection of the drive means during deflection.

The foregoing description is directed at the basic invention which provides for the weeding of the ground between rows of standing crops. The rod weeder of the present invention is adaptable to performing other diverse functions related to the provision of individual rotary rods. For example, on certain crops such as pinto beans, the rotary rod weeder of the present invention can be used to a real advantage for harvesting. In this use, the rod rolls the plants out, leaving the roots partially out of the ground, a desirable feature in harvesting these crops. Such a rod weeder would replace the swather or windrower, the former apparatus having a problem in that a portion of the bean pods are left near the ground and are cut off and wasted.

In order to facilitate its use as a harvester, the individual rods 80 may be replaced by a single continuous rod and, say, the center support 18 removed. On a unit having five supports 18, the two outboard and the center support could be removed for convenience. Since all references previously were for machines with 3 legs, this is now for removing 3 legs of a 5-leg machine. When modifying the weeder thusly it becomes imperative that the remaining legs be able to deflect simultaneously rather than individually. In FIGS. 1 and 1a, a locking means is shown with a hexagon locking shaft 110 extending from one outboard support 18 to the other outboard support 18. The shaft 110 passes through the hollow center of each rocker shaft 56 and is clamped thereto by means of clamp 112 shown in FIG. 1a. Clamp 112 consists of a fixed portion 114 welded to an exposed end of rocker shaft 56 and having a cut-out 116 coinciding with half the perimeter of shaft 110. A pair of bolts 118 are welded to the ends of fixed portion 114 and they are adapted to receive a clamping plate 120 and nuts 122 whereby a removable portion 124, identical to fixed portion 114 may be clamped to shaft 110. Thus, with hexagon shaft 110 and clamps 112 in place, all supports clamped to the shaft are unified such that deflection of one drive leg 40 will cause deflection of all drive legs 40 so clamped. It is understood that without the hexagon shaft and the clamps in place, only individual deflection of the drive legs is possible. While a hexagonal shaft has been illustrated, it is understood that any shaft having at least one flat thereon will operate as desired as long as the clamp 112 is appropriately designed.

As shown in FIGS. 1, 4, 5, 6 and 7 a carrier bar 126 is mounted forwardly of main bar 16 on supports 128 and is split in the centre in order to permit a free swing of the power take off shaft as the rod weeder is raised or lowered. While not explicitly illustrated, it is understood that by providing suitable supports, the vertical position of the carrier bar relative to the braces (and the main bar) may be adjusted to adjust the position of the various attachments, to be hereinafter described, relative to the ground. As mentioned above, the carrier bar 126 is positioned to accept various attachments to the rod weeder including coulters 130 (FIG. 4). Each coulter is essentially a circular steel blade 130 mounted for rotation in a vertical plane on a trailing bar 132. Bar 132 is mounted on the carrier bar in a manner analagous to the mounting of support means 18 on main bar 16 and is provided with its own tripping device 134 which is similar to and performs the same function as tripping device 45 to prevent damage if it should strike a stone or obstruction. Two coulters 130 are typically provided, one behind each wheel of the tractor, to prevent side swinging of the rod weeder, such that it runs straight in line. To some extent the coulters also loosen up the tractor wheel mark.

In addition to the coulters 130, a pair of depth control wheels (not shown) could also be attached to main bar 16 to control the working depth of the rotary weeder rod and the various attachments.

Figure 5:
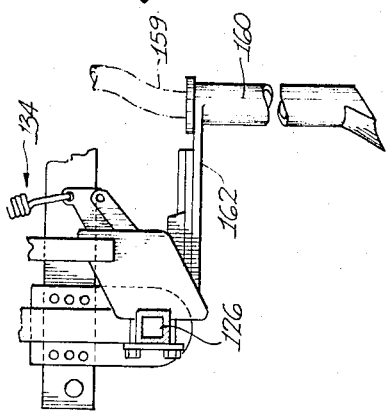
Figure 6:
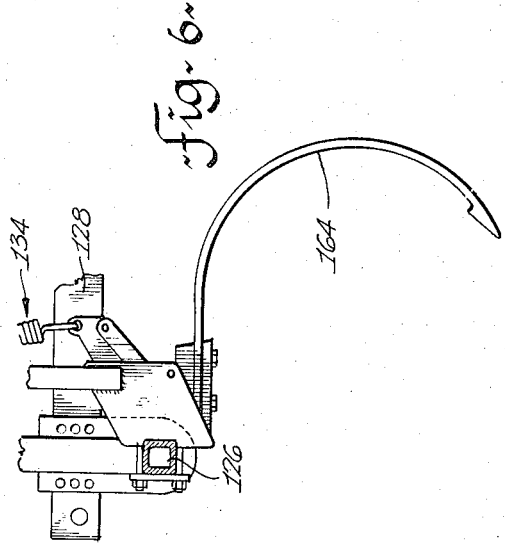

An optional attachment for mounting on the carrier bar and the main bar is a row crop seeder attachment 136 shown in FIGS. 5, 7 and 8, which may be used for seeding crops such as corn, beans or sunflowers in rows. When seeding, hexagon shaft 110 and clamps 112 are used to advantage and a continuous ground rod is utilized to weed any growth that might be in the ground at the time, to pack the seed and to leave a mulch on top of the ground to prevent the ground from drying out. Each seed box 138 is mounted on a frame 140 above main bar 16 between adjacent pairs of supports 18, drive for the seeder coming from drive wheel 142. Wheel 142 is mounted for rotation on strut 144 (FIG. 6) which, in turn, is removably mounted on main bar 16. A driver sprocket 146 is fixed to the hub of wheel 142 and drives chain 148 which runs parallel to strut 144 upwardly to a driven sprocket 150 fixed to a shaft mounted in suitable bearings atop the strut. An idler sprocket 151 is mounted on the strut in contact with the chain to ensure proper tension therein. The driven axle is provided with a universal joint 152 which connects to a shaft 154 which, in turn through a second universal joint 156, is connected to a drive shaft 158. The drive shaft 158 is provided with appropriate gearing to rotate a seed plate in each seed box 138 to dispense an appropriate flow of the appropriate seed. The seeds move along tubes 159 to the top of the hollow seeder legs 160 which as shown in FIG. 5 are removably mounted via arms 162 to carrier bar 126 in the same manner as are coulters 130. A similar tripping device 134 is provided for tripping the seeder legs should an obstruction be encountered. The seeder legs themselves are well known in the art and need not be described in detail herein.

A further attachment to the carrier bar 126 could be a plurality of cultivator shanks 164 (FIG. 6) which can be swung out of the ground so that they will not penetrate should their use be undesirable. The cultivator shanks are mounted in the same manner and with the same tripping device as are the coulters.

A final modification to the rod weeder of the present invention is illustrated in FIG. 7. When used as a bean, or other crop harvester with the continuous rod, auxiliary ground rod 166 may be adjustably fastened to the back of the drive legs 40 by way of clamping means 168. The auxiliary ground rod rotates in bearings formed in the two half-shoes 172 and 174. A sprocket 176 is fixed to the second ground rod and the chain is extended to fit around the new sprocket to drive both ground rods. By utilizing the second ground rod, the roots of the beans are brought right out of the ground and the harvested plant is much cleaner than when pulled by the single rod. It is understood that additional ground rods to the two shown in FIG. 7 could be added for even greater efficiency, for example, a third rod would be to the rear of and slightly above the second.

In operating in rows, where the ground surface is lower between the rows, it is desirous to utilize a stripper bar as shown in FIGS. 7, 9 and 10. A stripper bar becomes most important when an auxiliary rod such as 166 is used or when even a third rod is used, as these rods operate in little or no soil. Stripper bar 178 is bolted to half-shoe 174 via brackets 182 and bolts 180 and is supported at its ends by brackets 184 which are welded to the bar and encircle the rod 166. The stripper bar 178 is spaced a short distance behind the rod 166 (or 80 for that matter) and prevents plants from becoming wrapped around the rods. Without the stripper bar it is possible that the plants would wind themselves tightly about the rods and they would not be pulled up cleanly to be left on the surface.

While the invention has been described with reference to preferred embodiments, it will be understood that these are illustrative only, and the invention is limited solely by the appended claims.

I claim:

1. In a rotary rod weeder the improvement comprising a main mounting bar extending transverse to a desired line of travel; a plurality of individual rod support means mounted on said main mounting bar, each said support means comprising a mounting portion mounting said support means to said main mounting bar for independent movement therealong, a drive leg portion connected to said mounting portion and pivotable about an axis parallel to said main mounting bar and a single rotary rod journalled in said drive leg portion adjacent a lower end thereof, the rotary rod of one said support means being spaced from the rotary rod of an adjacent support means to permit the unimpeded passage therebetween of a row of a standing crop; rod drive means associated with each said rotary rod and including a drive shaft coaxial with said axis; and tripping means fixed to each said mounting portion and connected to the corresponding drive leg portion, whereby each said drive leg portion can be independently deflected away from an obstruction and then returned to its operating condition once the obstruction has been passed.

2. A rotary rod weeder according to claim 1 wherein said tripping means includes an inverted V-shaped bracket attached to said mounting portion and extending rearwardly and upwardly therefrom, a rocket shaft rotatably mounted in said mounting portion, a tension spring connected at one end to the apex of said bracket and at the other end to a first link, said first link being pivotably connected to a first arm fixed to said rocker shaft, a second arm projecting radially from said rocker shaft and a second link pivotably connected between said second arm and said drive leg portion whereby deflection of said drive leg portion rearwardly and upwardly effects movement of said arms and said links to extend said spring, said spring acting on said links and said arms to return said drive leg portion to its operating condition.

3. A rotary rod weeder according to claim 2 wherein said rod drive means includes a gear box mounted to a frame of said weeder for driving said drive shaft journaled for rotation parallel to said main bar, a plurality of first driver sprockets on said drive shaft, each support means including a first driven sprocket mounted opposite one of said first driver sprockets on said drive shaft which includes a cylindrical rotatable sleeve or tube coinciding with the pivot axis of said drive leg portion, a second driver sprocket mounted on said sleeve or tube within said drive leg, a second driven sprocket mounted on said rotary rod and first and second chains drivingly interconnecting said first and second driver and driven sprockets respectively.

4. In a rotary rod weeder the improvement comprising a main mounting bar extending transverse to a desired line of travel; a plurality of individual rod support means mounted on said main bar, each said support means comprising a mounting portion mounting said support means to said main bar for independent movement therealong, and a ground engaging drive leg portion pivotably attached to said mounting portion, rod drive means associated with each said support means; a single rotary rod journalled in each of said drive leg portions adjacent a lower end thereof and connected to said drive means; the rotary rod of one of said support means being spaced from the rotary rod of an adjacent support means to permit the unimpeded passage therebetween of a row of a standing crop; tripping means fixed to each said mounting portion and connected to the corresponding drive leg portion whereby each said drive leg portion can be independently deflected away from an obstruction and then returned to its operating condition once the obstruction has been passed; and locking means for locking said drive leg portions together so that an obstruction encountered by one of said drive leg portions or one of said rotary rods will cause deflection of all of said drive leg portions simultaneously, said locking means including a locking shaft removably positionable parallel to said main bar within a rocker shaft of each said tripping means, the rocker shaft of one tripping means being axially aligned with the rocker shaft of an adjacent tripping means, and clamping means attached to each said rocker shaft for clamping said locking shaft thereto whereby all of said rocker shafts and hence said drive leg portions are connected together.

5. A rotary rod weeder according to claim 3 including a carrier bar mounted forwardly of said main bar, at least two coulters movably mounted to said carrier bar and a tripping device connected to each said coulter to permit deflection thereof.

6. In a rotary rod weeder the improvement comprising a main mounting bar extending transverse to a desired line of travel; a plurality of rod support means mounted on said main bar, each said support means comprising a mounting portion mounting said support means to said main bar for independent movement therealong, and a ground engaging drive leg portion pivotably attached to said mounting portion, rod drive means associated with each said support means; a continuous rotary rod extending between and journalled in each of said drive leg portions adjacent a lower end thereof and connected to said drive means whereby said weeder may be used as a harvester; tripping means fixed to each said mounting portion and connected to the corresponding drive leg portion whereby each said drive leg portion can be deflected away from an obstruction and then returned to its operating condition once the obstruction has been passed; and locking means for locking said drive leg portions together so that an obstruction encountered by one of said drive leg portions or said continuous rotary rod will cause deflection of all of said drive leg portions simultaneously, said locking means including a locking shaft removably positionable parallel to said main bar within a rocker shaft of each said tripping means, the rocker shaft of one tripping means being axially aligned with the rocker shaft of an adjacent tripping means and clamping means attached to each said rocker shaft for clamping said locking shaft thereto whereby all of said rocker shafts and hence said drive leg portions are connected together.

7. A rotary rod weeder according to claim 6 and including at least one auxiliary rod mounted on said drive leg portion behind and slightly above said continuous rotary rod, said drive means being extended to drive said auxiliary rod.

8. A rotary rod weeder according to claim 5 and including seeder means mounted to said main bar, seeder drive means mounted to said main bar for driving said seeder means, seeder legs movably mounted to said carrier bar and connected to said seeder means and a tripping device connected to each said seeder leg to permit deflection thereof.

9. A rotary rod weeder according to claim 5 and including a plurality of cultivator shanks movably mounted to said carrier bar and a tripping device connected to each said cultivator shank to permit deflection thereof.

10. A rotary rod weeder according to claim 7 and including stripping bar means mounted slightly behind said auxiliary rod to strip vegetation from said auxiliary rod.

* * * * *